United States Patent
Yadav et al.

(10) Patent No.: US 7,921,267 B1
(45) Date of Patent: Apr. 5, 2011

(54) METHOD AND SYSTEM FOR FIXING A MIRROR OF A DATASET

(75) Inventors: Vikas Yadav, Sunnyvale, CA (US); Raghu Arur, Sunnyvale, CA (US); Amol R. Chitre, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 514 days.

(21) Appl. No.: 11/643,484

(22) Filed: Dec. 20, 2006

(51) Int. Cl.
*G06F 13/00* (2006.01)
(52) U.S. Cl. .................................................. 711/162
(58) Field of Classification Search .................... None
See application file for complete search history.

(56) References Cited

U.S. PATENT DOCUMENTS

| | | | |
|---|---|---|---|
| 5,819,292 | A | 10/1998 | Hitz et al. |
| 7,007,046 | B2 | 2/2006 | Manley et al. |
| 7,143,120 | B2 * | 11/2006 | Oks et al. ..................... 707/202 |
| 2003/0182330 | A1 | 9/2003 | Manley et al. |
| 2004/0268178 | A1 * | 12/2004 | Fredin ............................. 714/6 |
| 2005/0144202 | A1 * | 6/2005 | Chen .............................. 707/205 |
| 2007/0038682 | A1 * | 2/2007 | Kulesza et al. ............... 707/202 |

* cited by examiner

*Primary Examiner* — Duc T Doan
(74) *Attorney, Agent, or Firm* — Blakely, Sokoloff, Taylor & Zafman LLP (57) ABSTRACT

A system and method for fixing data inconsistency between an original dataset stored on a source storage server and a mirror of the original dataset stored on a destination storage server is provided. The method determines whether the mirror is consistent with the original dataset by comparing metadata describing the original dataset with metadata describing the mirror. If the mirror is inconsistent with the original dataset, corresponding block(s) of the original dataset is/are requested and received from the source storage server. The mirror is then fixed according to the received block(s).

27 Claims, 5 Drawing Sheets

METHOD AND SYSTEM FOR FIXING A MIRROR OF A DATASET

FIELD OF THE INVENTION

At least one embodiment of the present invention pertains to storage systems, and more particularly, to fixing a mirror of a dataset.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

In file servers, data is stored in logical containers called volumes, which may be identical with, or subsets of, aggregates. An "aggregate" is a logical container for a pool of storage, combining one or more physical mass storage devices (e.g., disks) or parts thereof into a single logical storage object, which contains or provides storage for one or more other logical datasets at a higher level of abstraction (e.g., volumes). A "volume" is a set of stored data associated with a collection of mass storage devices, such as disks, which obtains its storage from (i.e., is contained within, and may be coextensive with) an aggregate, and which is managed as an independent administrative unit, such as a complete file system. A "file system" is an independently managed, self-contained, hierarchal set of data units (e.g., files, blocks or LUNs). Although a volume or file system (as those terms are used herein) may store data in the form of files that is not necessarily the case. That is, a volume or file system may store data in the form of other units, such as blocks or LUNs.

One feature which is useful to have in a storage server is the ability to create a read-only, persistent, point-in-time image (RPPI) of a dataset, such as a volume or a LUN, including its metadata. This capability allows the exact state of the dataset at a particular point in time to be restored from the RPPI in the event of, for example, data corruption or accidental data deletion. The ability to restore data from an RPPI provides administrators with a simple mechanism to revert the state of their data to a known previous point in time as captured by the RPPI. Typically, creation of an RPPI or restoration from an RPPI can be controlled from a client-side software tool. An example of an implementation of an RPPI is a Snapshot™ generated by SnapDrive™ or SnapManager® for Microsoft® Exchange software, both made by NetApp. Unlike other RPPI implementations, NetApp Snapshots do not require duplication of data blocks in the active file system, because a Snapshot can include pointers to data blocks in the active file system, for any blocks that have not been modified since the Snapshot was created. The term "Snapshot" is used in this document without derogation of Network Appliance, Inc.'s trademark rights. The "active" file system is the current working file system, where data may be modified or deleted, as opposed to an RPPI, which is a read-only copy of the file system saved at a specific time.

An example of an RPPI technique, which does not require duplication of data blocks to create an RPPI, is described in U.S. Pat. No. 5,819,292, which is incorporated herein by reference, and which is assigned to Network Appliance. Among other advantages, this technique allows an RPPI to be created quickly, helps to reduce consumption of storage space due to RPPIs, and reduces the need to repeatedly update data block pointers as was required in some prior art RPPI techniques.

In order to improve reliability and facilitate disaster recovery in the event of a failure of a storage system, its associated disks or some portion of the storage infrastructure, it is common to "mirror" or replicate a dataset. Here, the term "mirror" refers to a replica of a dataset. The term "mirroring" refers to the process of creating a mirror for a data set. The original dataset is also called a "source dataset" with respect to the mirror. A dataset is a set of data. Examples of datasets include, e.g., a file system, a volume, a directory, a file, or an RPPI of any of the above.

Conventional mirroring and archival backup systems typically include processes to ensure that a dataset is correctly mirrored, to thereby prevent any inconsistencies between the mirror and the original dataset. However, errors may occur in the archival backup or mirror due to, e.g., network errors, software errors and/or physical media errors of the storage devices. As a result of such errors, the mirror/backup may not be identical to the original dataset, which may cause data loss should an error condition occur on the source system. Data inconsistency caused by errors or data corruptions is called "divergence", as opposed to "lag" which refers to data inconsistency which occurs when a mirror or archival backup is not timely updated to reflect any latest changes of the original dataset. To ensure that a correct mirror is on the destination, a new mirroring relationship may need to be established and an initial baseline backup operation may need to be performed of the dataset. This adds management overhead. Furthermore, significant additional storage capacity is needed to create new mirroring relationship.

SUMMARY OF THE INVENTION

The present invention provides a method and system for fixing data inconsistency between an original dataset stored on a source storage system and a mirror of the original dataset stored on a destination storage system. Advantageously, the present invention re-writes only inconsistent data to a mirror destination, thereby avoiding creating a new mirror relationship and discarding the old mirrors. As a result, the present invention reduces management overhead and saves storage space that otherwise would have been required for new mirror relationship. According to an embodiment of the present invention, a novel method includes determining whether the mirror is consistent with the original dataset by comparing a first set of metadata of the original dataset and a second set of metadata of the mirror. The method further includes fixing the mirror to make the mirror consistent with the original dataset if the mirror is inconsistent with the original dataset.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system for fixing a mirror of an original dataset to make the mirror consistent with the original dataset are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A system and method for fixing data inconsistency between an original dataset stored on a source storage server and a mirror of the original dataset stored on a destination storage server is provided. The method determines whether the mirror is consistent with the original dataset by comparing metadata describing the original dataset with metadata describing the mirror. If the mirror is inconsistent with the original dataset, corresponding block(s) of the original dataset is/are requested and received from the source storage server. The mirror is then fixed according to the received block(s).

Figure 1:
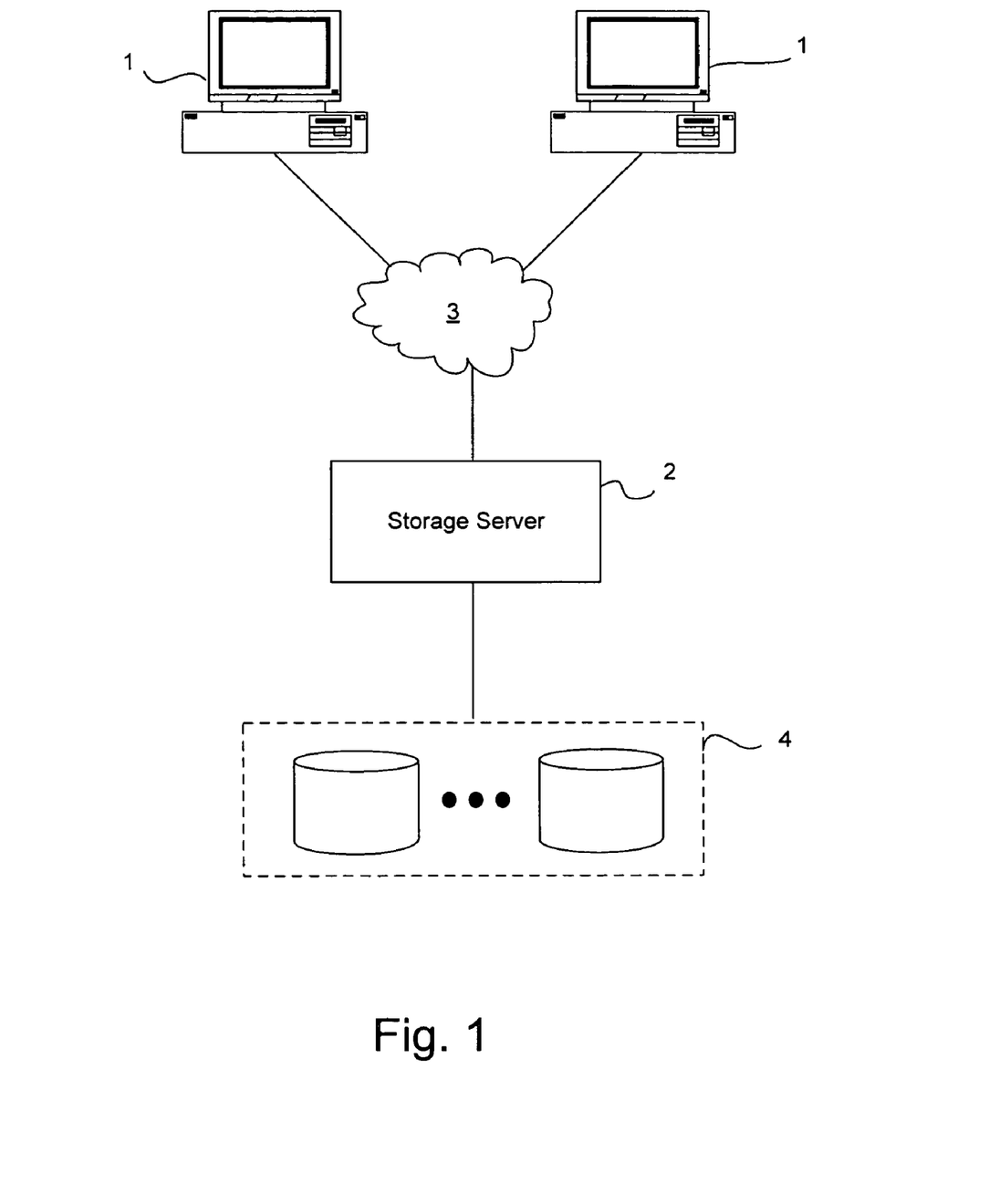
FIG. 1 illustrates a network environment in which the present invention may be implemented.

FIG. 1 illustrates an example of a network environment in which the described techniques can be implemented. The network environment of FIG. 1 includes a storage server 2 coupled locally to a storage subsystem 4 that includes set of mass storage devices, and to a set of clients 1 through an interconnect 3. The above-described techniques for fixing mirror divergence in a logical mirror can be implemented in the storage server 2.

The storage server 2 receives various read and write requests from the clients 1 and accesses the storage subsystem 4 to service those requests. Each of the clients 1 may be, for example, a conventional personal computer (PC), server-class computer, workstation, or the like. The mass storage devices in storage subsystem 4 may be, for example, conventional magnetic tapes or disks, optical disks such as CD-ROM or DVD based storage, magneto-optical (MO) storage, or any other type of non-volatile storage devices suitable for storing large quantities of data, or a combination thereof. The storage subsystem 4 may be organized into one or more groups of Redundant Array of Independent Disks (RAID).

The storage server 2 may be, for example, a file server, or "filer", such as may be used in a NAS environment. Alternatively, the storage server may provide clients with block-level access to stored data, such as in SAN environment. In yet another embodiment, the storage server 2 may be capable of operating in both modes, i.e., NAS and SAN. The storage server 2 can implement one or more of various different protocols, such as Common Internet File System (CIFS) protocol, Network File System (NFS) protocol, Hypertext Transport Protocol (HTTP) protocol, Simple Network Management Protocol (SNMP), Transfer Control Protocol/Internet protocol (TCP/IP), etc., and can selectively use these protocols as needed.

In a NAS implementation, the interconnect 3 may be any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

Figure 2:
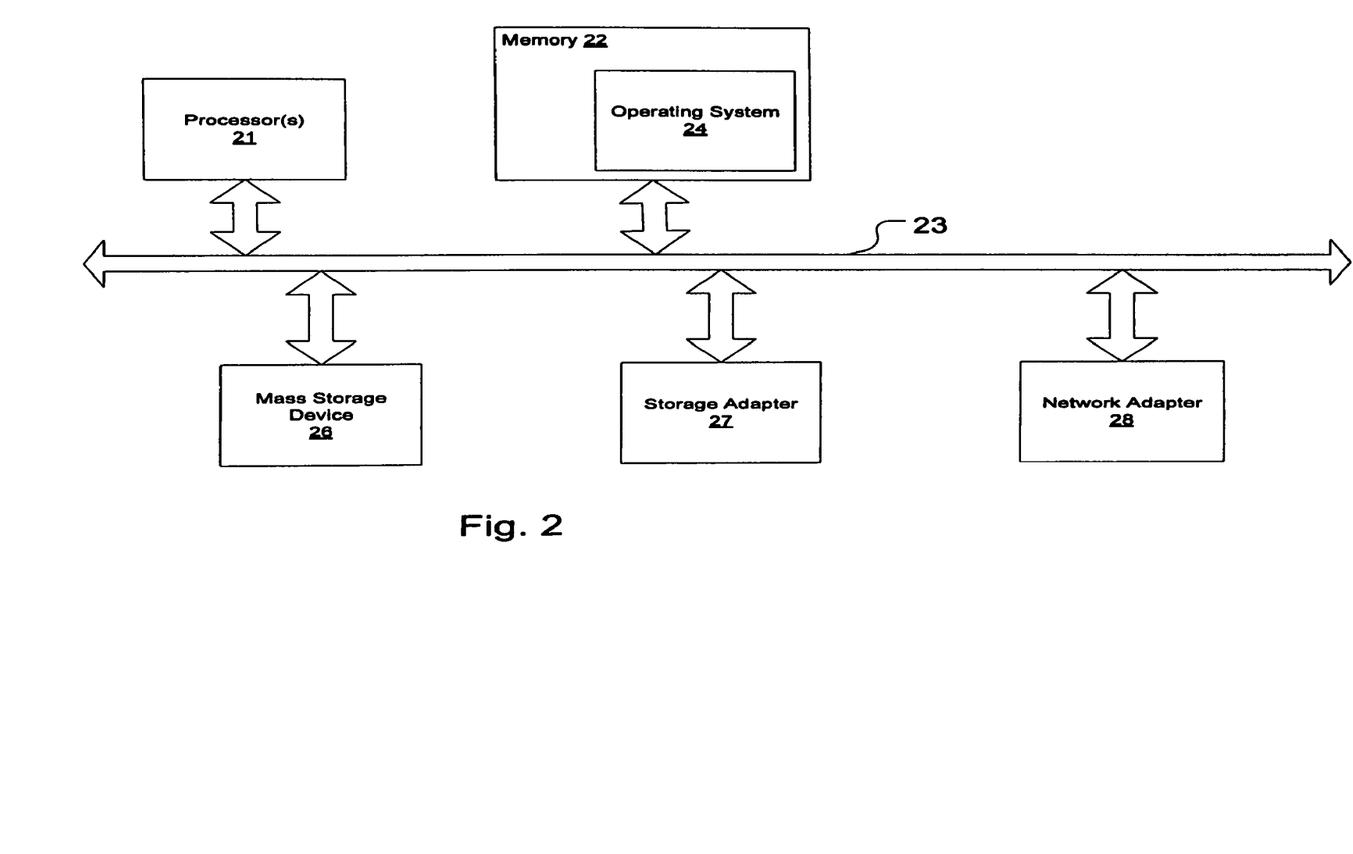
FIG. 2 is a high-level block diagram of a storage server.

FIG. 2 is a high-level block diagram of the storage server 2 of FIG. 1, according to an embodiment of the present invention. Certain standard and well-known components which are not germane to the present invention are not shown. The storage server 2 includes one or more processors 21 coupled to a bus system 23.

The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). The processors 21 are the central processing units (CPUs) of the storage server 2 and, thus, control the overall operation of the storage server 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 2 also includes a memory 22 coupled to the bus system 23. The memory 22 represents any form of random access memory (RAM), read-only memory (ROM), flash memory, or a combination thereof. Memory 22 stores, among other components, the operating system 25 of the storage server 2, in which the techniques introduced here can be implemented.

Also connected to the processors 21 through the bus system 23 are a mass storage device 26, a storage adapter 27, and a network adapter 28. Mass storage device 26 may be or include any conventional medium for storing large quantities of data in a non-volatile manner, such as one or more disks. The storage adapter 27 allows the storage server 2 to access the storage subsystem 4 and may be, for example, a Fibre Channel adapter or a SCSI adapter. The network adapter 28 provides the storage server 2 with the ability to communicate with remote devices, such as the clients 1 over a network and may be, for example, an Ethernet adapter or a Fibre Channel adapter.

Memory 22 and mass storage device 26 store software instructions and/or data, which may include instructions and/ or data used to implement the techniques introduced here. These instructions and/or data may be implemented as part of the operating system 24 of the storage server 2.

Figure 3:
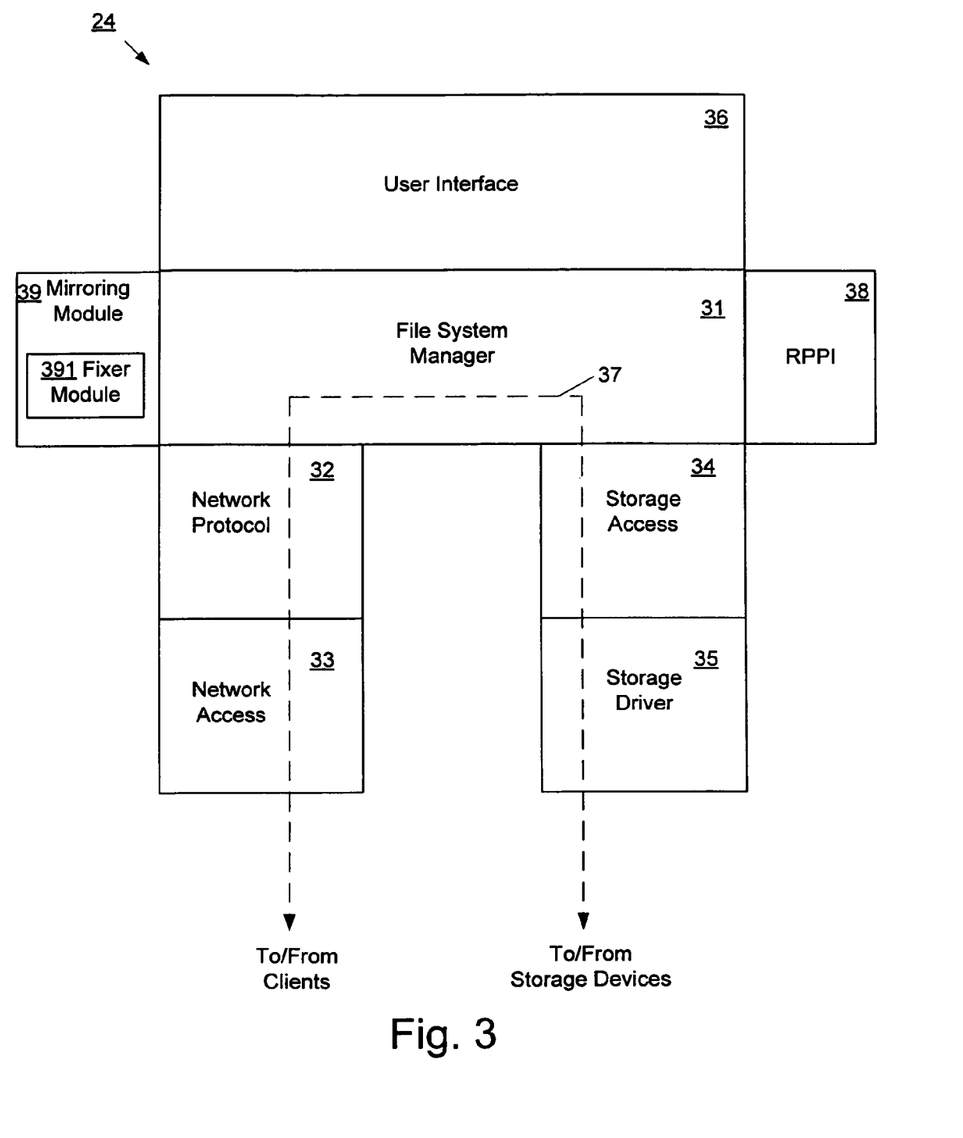
FIG. 3 illustrates the operating system of the storage server.

As shown in FIG. 3, the operating system 24 of the storage server 2 can include several modules, or layers. These modules or layers include a file system manager 31, a network protocol layer 32, a network access layer 33, a storage access layer 34 and a storage driver layer 35. The file system manager 31 is an application-level programmatic entity which imposes a structure (e.g. hierarchical) on volumes, files, directories and/or other data containers stored and/or managed by a storage server 2, which services read/write requests from clients of the storage server. An example of a file system manager employed by the present invention is WAFL® file system that is part of the Data ONTAP® storage operating system, both provided by Network Appliance, Sunnyvale, Calif. A person of ordinary skill in the art would understand that other file systems can be used in accordance with the inventive principles described herein.

Logically, under the file system manager 31, the operating system 24 also includes a network protocol layer 32 and an associated network access layer 33, to allow the storage server 2 to communicate over a network (e.g., with clients 1). The network protocol layer 32 implements various protocols, such as NFS, CIFS, HTTP, SNMP, and TCP/IP. The network access layer 33 includes one or more drivers, which implement one or more protocols to communicate over the interconnect 3, such as the Ethernet or Fibre Channel. Also logically under the file system manager 31, the operating system 24 includes a storage access layer 34 and an associated storage driver layer 35, to allow the storage server 2 to communicate with the storage subsystem 4. The storage access layer 34 implements a storage redundancy protocol, such as, for example, RAID-4 or RAID-5. It should be understood that other types and levels of RAID implementations may be used in accordance with the inventive principles described herein. The storage driver layer 35 implements a lower-level storage device access protocol, such as Fibre Channel or SCSI. Reference numeral 37 in FIG. 3 shows the data access path through the operating system 24, associated with servicing read and write requests from clients.

The operating system 24 may also include an RPPI layer 38, which interfaces with the file system manager 31 and external RPPI client software (which is not shown in FIGS. 1-3), to allow creation of RPPIs and restoration of data from RPPIs. The operating system 24 may further include a user interface layer 36, which implements a graphical user interface (GUI) and/or a command line interface (CLI), for example, such as for purposes of administrative access to the storage server 2.

The operating system 24 may further include a mirroring module 39, which generates mirrors of datasets and manages data backups in accordance with an embodiment of the present invention. According to the present invention, the mirroring module 39 includes a fixer module 391, which is described in detail below.

Figure 4:
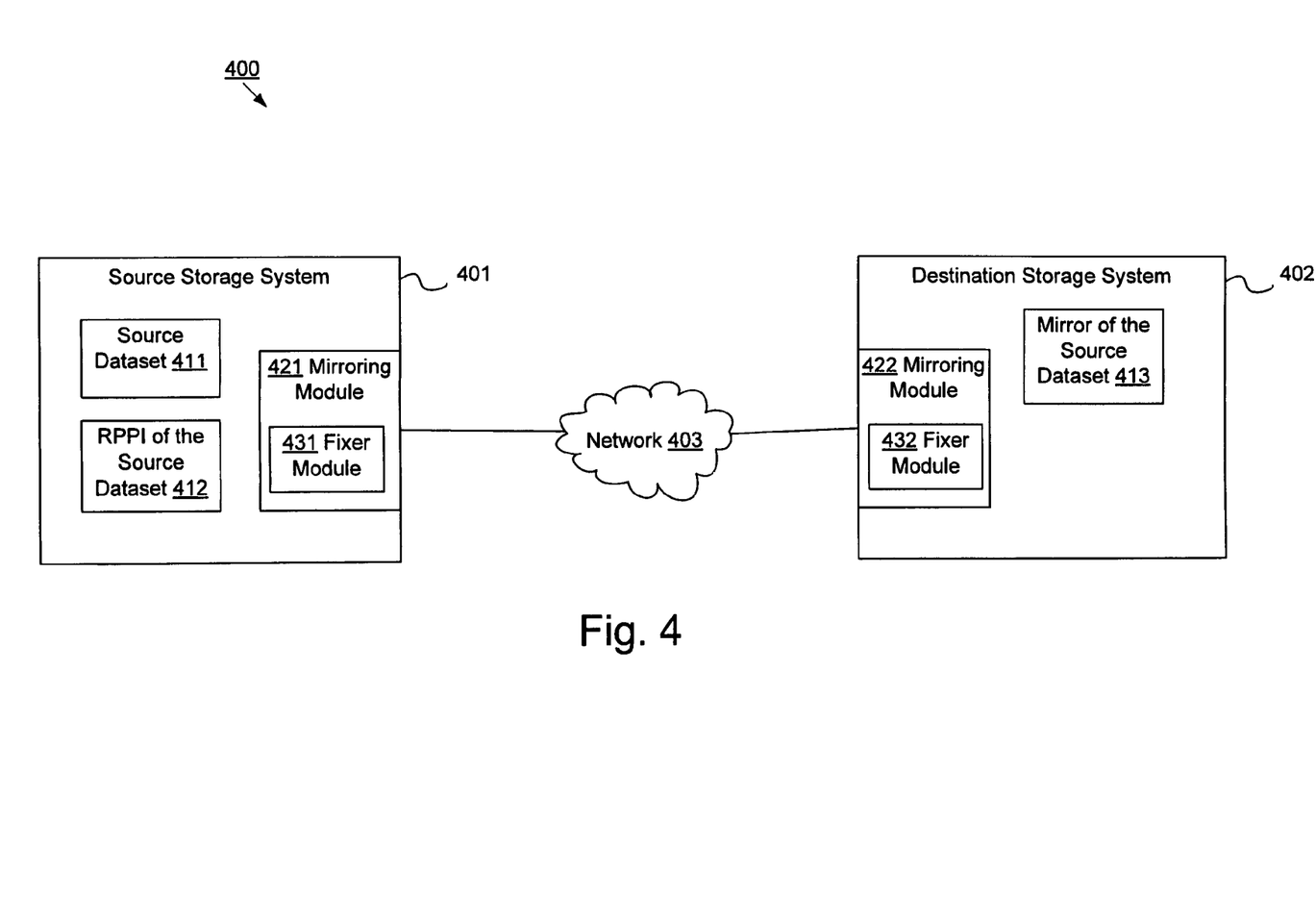
FIG. 4 is a schematic block diagram of a storage system environment that includes a pair of interconnected storage systems including a source storage server and a destination storage server that may be advantageously used with the present invention.

FIG. 4 is a schematic block diagram of a storage system environment 400 that includes a pair of interconnected storage systems, including a source storage system 401 and a destination storage system 402, which may be advantageously used with the present invention. Each of the source and destination storage systems 401-402 may include a storage server such as described in FIGS. 1 and 2 executing an operating system such as shown in FIG. 3. As used herein, the term "source" indicates location from which subject data travels during a mirroring operation. "Destination" means location to which data travels. As shown in FIG. 4, the source and destination storage systems 401-402 are linked via an interconnect, such as a network 403, that may comprise a local or wide area network, such as the Internet. A person of ordinary skill in the art would understand that a source storage system and a destination storage system could be linked via a direct link, or via loopback. A loopback is a "networking" arrangement internal to a single computer for transmitting a data stream between local source and local destination. In such as case, a source system and a destination system are the same storage system.

Also, as shown in FIG. 4, the source storage system 401 maintains a source dataset 411. In one embodiment, the source dataset 411 is an active file system. A person of ordinary skill in the art would understand that the dataset could also be a volume, a LUN, a directory, a file, etc. A mirroring module 421 on the source storage system 401 and a mirroring module 422 on the destination storage system control the process of creating the mirror 413 of the source dataset 411 on the destination storage system 402. In one embodiment, an RPPI 412 of the source dataset 411 is created on the source storage system 401. The RPPI 412 is utilized to perform an initial data transmission to the destination storage system 402. At a later point in time, a second RPPI (not shown in FIG. 4) of the source dataset 411 is created. This second RPPI is compared with the RPPI 412 to determine the changes in the source dataset 411 in between the time the two RPPIs were created. These changes may be sent from the source storage system 401 to the destination storage system 402 for updating the mirror 413 on the destination storage system 402. Mirroring or replication of stored data in remote storage locations over a network is described in detail in a commonly-owned U.S. patent application Ser. No. 10/100,950, entitled "SYSTEM AND METHOD FOR ASYNCHRONOUS MIRRORING OF SNAPSHOTS AT A DESTINATION USING A PURGATORY DIRECTORY AND INODE MAPPING," by Stephen L. Manley, et al, which disclosure is incorporated by reference herein.

The present invention provides a system and method for fixing the mirror 413 of the source dataset 411 if the mirror 413 is divergent from the source dataset 411. As described above, the mirror 413 is created based on the RPPI 412 of the source dataset 411. Thus, the mirror 413 is considered to be divergent from the source dataset 411 if the mirror 413 is inconsistent with the RPPI 412.

As shown in FIG. 4, the present invention is illustratively implemented by a fixer module 431 executing on the source storage system 401 that communicates with a fixer module 432 executing on the destination storage system 402. An administrator or a software process (e.g., a mirror management application) may invoke the fixer module 432 on the destination storage system 402 to start a fixing process. The administrator or the software process (not shown in FIG. 4) specifies the mirror that may need to be fixed. For example, the administrator or the software process may instruct the fixer module 432 to fix the mirror 413. The fixer module 432 then determines the source dataset of the mirror 413. In one embodiment, the mirroring module 422 of the destination storage system 402 maintains all mirroring relationships created over a period of time. Each mirroring relationship may record the name/ID of the mirror and the RPPI of the source dataset from which the mirror was created. Thus, the fixer module 432 on the destination storage system 402 uses, for example, names/IDs of the mirror and the RPPI of the source dataset to determine where the source dataset of the mirror 413 is located. Specifically, because the mirroring relationship records the mapping between the mirror and the RPPI of the source dataset, mirroring module 422 may determine which point-in-time image of the source dataset is mirrored.

For example, in FIG. 4, the fixer module 432 may determine that the source dataset of the mirror 413 is the RPPI 412 of the source dataset 411, which is located in the source storage system 401. The fixer module 432 then sends a connection request to the fixer module 431 running on the source storage system 401. After the connection is established, the fixer module 432 requests the fixer module 431 to send a stream of data representing the RPPI 412 of the source dataset 411. In an illustrative embodiment, the datastream may comprise metadata associated with the RPPI 412. In general, metadata associated with a dataset may include metadata describing the structure of the dataset, e.g., a directory structure, file location, etc. If the data is stored as a plurality of blocks, metadata associated with the dataset may include metadata of each of the plurality of blocks, including, for example, a RAID checksum for each block, which indirectly reflects the structure of the dataset, such as the directory structure, file location, etc. RAID checksum is generated for a block when a storage operating system, such as the one shown in FIG. 3, writes data to a disk(s). RAID checksums are typically computed by a RAID subsystem, such as the one implemented by storage access layer 34 of the storage operating system 24 (shown in FIG. 3). A checksum can be computed by sequentially combining all the bytes of data for a block (e.g., 4 Kb) with a series of arithmetic or logical operations. When data is read from the disk(s), a new checksum is calculated and compared with the one originally sent along with the data to determine whether the data written to disk(s) is valid.

In an alternate embodiment, the datastream sent by the fixer module 431 may comprise the entire data of the RPPI 412. The datastream is transmitted to the destination storage system 402 and compared with the mirror 413 by the fixer module 432.

Figure 5:
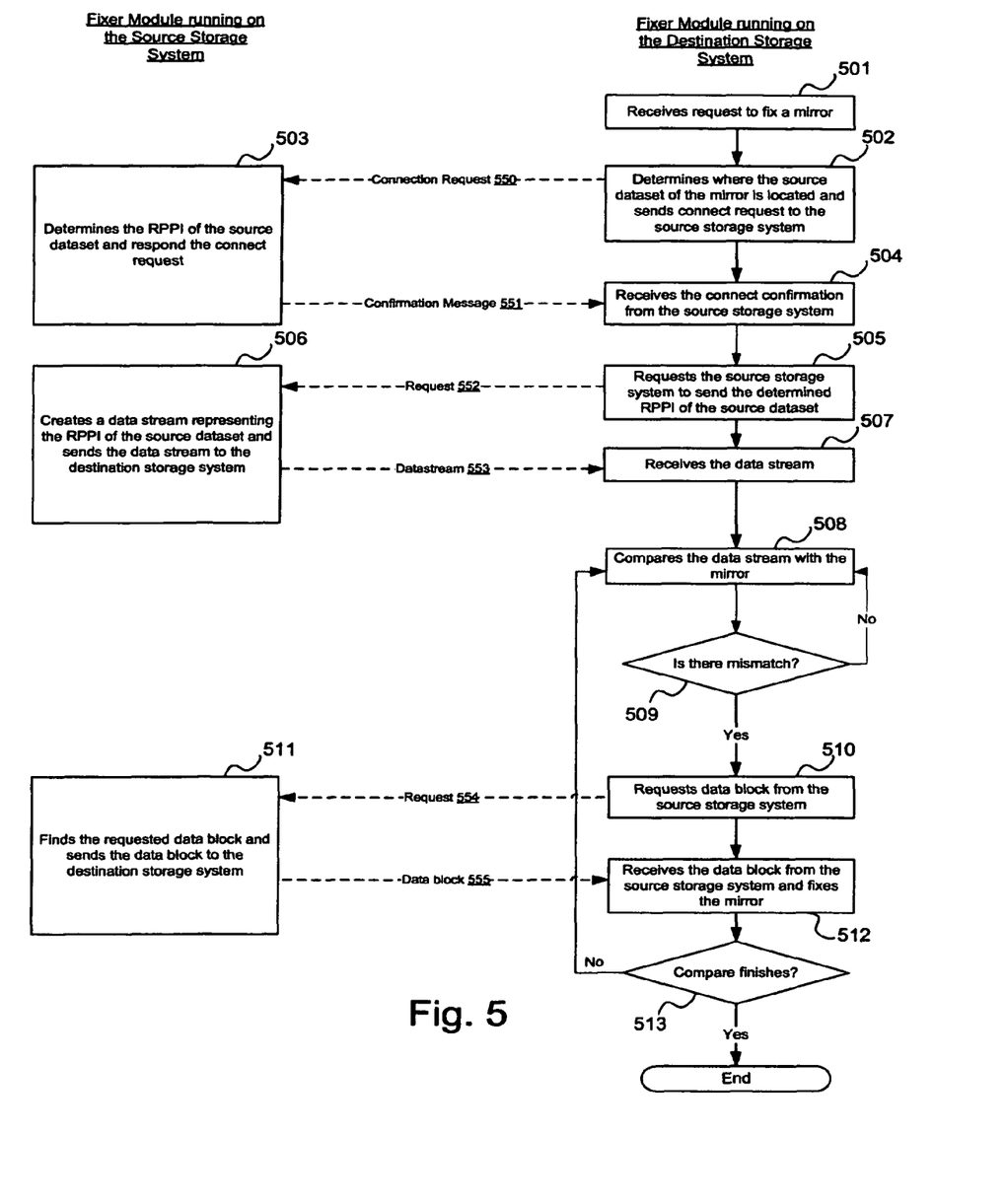
FIG. 5 is a flowchart describing the steps of fixing data inconsistency between an original dataset stored on a source storage system and a mirror of the original dataset stored on a destination storage system in accordance with an illustrative embodiment of the present invention.

FIG. 5 is an event diagram showing communication between a fixer module 431 running on the source storage system 401 and a fixer module 432 running on the destination storage system 402 in accordance with an illustrative embodiment of the present invention. The fixer module 432 running on the destination storage system 402 may be invoked by an administrator or a software process. An administrator may invoke the fixer module 432 via a command line interface (CLI) command or via a graphical user interface (GUI), e.g., from a management console coupled to the destination storage system 402 (the console is not shown in FIGS. 1-5). In an alternative embodiment, the fixer module 432 may be automatically invoked. For example, the system administrator may configure the destination storage system 402 so that the fixer module 432 executes on a periodic basis or may, for example, configure the fixer module 432 to execute at the conclusion of any mirroring activity.

Once the fixer module 432 on the destination storage system 402 is invoked, at step 501, the fixer module 432 receives a request from the system administrator or the software process to fix data inconsistency between a source dataset 411 stored on the source storage system 401 and a mirror of the source dataset 413 stored on the destination storage system 402. The administrator or the software process may specify a comparison level. Exemplary levels may include comparisons performed on a data level or on a checksum level. A person of ordinary skill in the art would understand that other comparison levels may be used to compare the source dataset and its mirror. Comparison on the level of data may cause data blocks to be compared on a byte-by-byte basis. Comparison on the checksum level utilizes RAID checksums to compare data blocks.

At step 502, the fixer module 432 on the destination storage system 402 determines where the source dataset of the mirror to be fixed is located. As discussed above, the mirroring module 422 of the destination storage system 402 maintains information indicating where the source dataset of the mirror is located. In one implementation, the information is stored in a mapping table (not shown in FIGS. 1-5). A person of ordinary skill in the art would understand that such information may be stored in any representation. The information also indicates the specific RPPI of the source dataset from which the mirror was created. The fixer module 432 then sends a connection request 550 to the fixer module 431 executing on the source storage system 401. In one embodiment, the request 550 includes name/ID of the RPPI of the source dataset from which the mirror was created and name/ID of the mirror. At step 503, the fixer module 431 executing on the source storage system 401 receives the connection request 550. The fixer module 431 on the source storage system 401 confirms that there exists mirroring relationship between the mirror and the RPPI of the source dataset. Upon confirming the existence of the relationship, the fixer module 431 on the source storage system 401 sends a confirmation message 551 back to the fixer module 432 on the destination storage system 402. At step 504, the fixer module 432 on the destination storage system 402 receives the confirmation message 551 from the fixer module 431 on the source storage system 401. At step 505, the fixer module 432 on the destination storage system 402 sends a request 552 to the fixer module 431 on the source storage system 401 for RPPI of the source dataset. In one embodiment, the request 552 also includes information indicating the level of comparison (e.g., data level, checksum level).

At step 506, the fixer module 531 on the source storage system 501 receives the request. Based on the specified level of comparison, the fixer module 531 creates a datastream 553 representing the RPPI. For example, if the level of comparison is at the data level, the datastream 553 includes actual data of all data blocks storing the RPPI. If the level of comparison is at the checksum level, the datastream 553 may include RAID checksums of all data blocks storing the RPPI. Transmitting for comparison checksums instead of actual data blocks has low network bandwidth requirement.

After the datastream 553 is created, the fixer module 531 on the source storage system 501 sends the datastream 553 to the fixer module 532 on the destination storage system 502. At step 507, the fixer module 532 on the destination storage system 502 receives the datastream 553 representing the RPPI of the source dataset of the mirror. At step 508, the fixer module 532 on the destination storage system 502 compares the datastream 553 with the mirror to determine whether the mirror is consistent with the RPPI. In one embodiment, if the datastream 553 includes the RPPI, then actual data blocks are being compared with the mirror. However, if the comparison is at the checksum level, the checksum of the actual data of the RPPI instead of actual data blocks is compared with the checksum of the actual data of the mirror.

At step 509, the fixer module on the destination storage system determines whether there is a mismatch between the datastream 553 and the mirror. If there is a mismatch, the fixer module 432 on the destination storage system 402 checks which part of the datastream 553 is inconsistent with the mirror. In one embodiment, the datastream 553 includes information indicating the mapping between part (e.g., a packet) of the datastream 553 and the corresponding data block of the RPPI. Thus, the fixer module 332 is able to determine which data block of the RPPI is represented by the particular part of the datastream 553. If the comparison is at the data level, the datastream 553 includes the actual data blocks. If the comparison is at the checksum level, the datastream 553 contains the checksum information. Thus, in this embodiment, at step 510, the fixer module 432 on the destination storage system 402 sends a request 554 to source storage system 402 for the actual data of the corresponding data block. At step 511, the fixer module 431 on the source storage system 401 finds the corresponding data block 555 and sends data to the fixer module 432 on the destination storage system 402. At step 512, the fixer module 432 on the destination storage system 402 receives the data block 555 and uses the data to fix data inconsistency between an original dataset stored on the source storage system 401 and a mirror of the original dataset stored on the destination storage system 402. In one embodiment, the fixer module 432 first identifies and deletes the block in the mirror that is inconsistent with the RPPI of the source dataset. Then, the fixer module 432 creates a new block that contains the received data block 555 and adds the new block to the mirror.

At step 513, the fixer module 432 on the destination storage system 402 determines whether the comparison is finished. If so, the process ends. Otherwise, the process goes back to step 508 to continue the comparing process. Note that depending on the type of inconsistency, the fixer process may only need to delete an inconsistent block or only need to add new block to the mirror. Note that when the datastream 553 comprises the entire data of the RPPI (not just the RAID checksum), the fixer module 432 on the destination storage system 402 does not need to request the actual data again from the source storage system 401.

In one embodiment, during a process of fixing inconsistencies, the RPPI of the source dataset may need to be locked on the source storage system 401, and the mirror may need to be locked on the destination storage system 402 so that no user or process is able to change them during the fixing process. Also, after the mirror is fixed, an RPPI of the mirror may be created so that the mirror may be restored from the RPPI.

Alternatively, the process illustrated in FIG. 5 may compare the datastream 553 with an RPPI of the mirror (if the RPPI is consistent with the mirror) to find any inconsistency. If the RPPI of the mirror is inconsistent with the datastream, this indicates that the mirror is inconsistent with the datastream because the RPPI of the mirror is consistent with the mirror. Because RPPI is read-only, RPPI cannot be fixed to address inconsistency. Thus, the mirror is being fixed to address inconsistency between the datastream and the RPPI of the mirror.

Note that using RAID checksums to fix a mirror is one example of fixing a mirror. Any kind of metadata, other than RAID checksums, can be used to fix a mirror according to the process described in FIG. 5. These metadata may include, but is not limited to, a cyclic redundancy check (CRC) checksum, user defined metadata, etc.

Thus, the present invention provides a method and system for fixing data inconsistency between an original dataset stored on a source storage system and a mirror of the original dataset stored on a destination storage system. Advantageously, the present invention re-writes only inconsistent data to a mirror destination, thereby avoiding creating a new mirror relationship and discarding the old mirrors. As a result, the present invention reduces management overhead.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for fixing data inconsistency between an original dataset stored as a first plurality of blocks on a source storage system and a mirror of the original dataset stored as a second plurality of blocks on a destination storage system, the method comprising:

determining, by a destination storage system, a read-only persistent point-in-time image (RPPI) of the original dataset, wherein the mirror of the original dataset is created from the RPPI of the original dataset, and wherein the RPPI of the original dataset is stored on the source storage system;

receiving, by the destination storage system, a message from the source storage system confirming a relationship between the RPPI of the original dataset and the mirror of the original dataset;

receiving, by the destination storage system, a datastream representing the RPPI of the original dataset from the source storage system, wherein the datastream comprises a first set of metadata associated with the RPPI of the original dataset;

determining, by the destination storage system, whether the mirror is consistent with the datastream representing the RPPI of the original dataset by comparing the first set of metadata associated with the RPPI of the original dataset and a second set of metadata associated with the mirror, wherein the second set of metadata is stored on the destination storage system; and fixing, by the destination storage system, the mirror to make the mirror consistent with the RPPI of the original dataset, responsive to the mirror being inconsistent with the datastream representing the RPPI of the original dataset, wherein only a portion of the mirror which is inconsistent is fixed.

2. The method of claim 1, wherein the mirror is fixed without creating a new mirror.

3. The method of claim 1, wherein the first set of metadata includes metadata of each of the first plurality of blocks and the second set of metadata includes metadata of each of the second plurality of blocks.

4. The method of claim 3, wherein metadata of the first plurality of blocks and the second plurality of blocks comprises a checksum for the corresponding block.

5. The method of claim 3, wherein fixing the minor to make the minor consistent with the datastream representing the RPPI of the original dataset comprises:
    identifying a first portion of the datastream representing the RPPI of the original dataset that is inconsistent with a second portion of the mirror;
    receiving the first portion of the RPPI of the original dataset from the source storage system; and
    fixing the mirror according to the first portion.

6. The method of claim 5, wherein the first portion of the RPPI of the original dataset comprises at least one of the first plurality of blocks and the second portion of the mirror comprises at least one of the second plurality of blocks.

7. The method of claim 6, wherein fixing the minor according to the first portion comprises:
    deleting said at least one of the second plurality of blocks; and
    adding at least one new block to the mirror, said new block or blocks being consistent with said at least one of the first plurality of blocks.

8. The method of claim 1, wherein the original dataset comprise a volume, a directory, a file, or a read-only, persistent point-in-time image (RPPI) of a volume, a directory or a file.

9. A storage server comprising:
    a processor;
    a network interface through which to communicate with a client;
    a storage interface through which to access one or more mass storage devices; and
    a memory coupled to the processor, the memory storing instructions which, when executed by the processor, cause the storage server to perform a process comprising:
        determining, by the storage server, a read-only persistent point-in-time image (RPPI) of a first dataset, wherein a second dataset is created from the RPPI of the first dataset, wherein the RPPI of the first dataset is stored as a first plurality of blocks on another storage server and wherein the second dataset is stored as a second plurality of blocks on the one or more mass storage devices;
        receiving, by the storage server, a message from the another storage server confirming a relationship between the RPPI of the first dataset and the second dataset;
        receiving, by the storage server, a datastream representing the RPPI of the first dataset from the another storage server, wherein the datastream comprises a first set of metadata of the RPPI of the first dataset, and wherein the first set of metadata includes metadata associated with each of the first plurality of blocks;
        comparing, by the storage server, the first set of metadata with a second set of metadata of the second dataset to determine whether the second dataset is consistent with the datastream representing the RPPI of the first dataset, wherein the second set of metadata includes metadata associated with each of the second plurality of blocks; and
        if the second dataset is inconsistent with the datastream representing the RPPI of the first dataset, fixing, by the storage server, the second dataset to make the second dataset consistent with the datastream representing the RPPI of the first dataset, wherein only a portion of the second dataset which is inconsistent is fixed.

10. The storage server of claim 9, wherein the metadata of each of the first and second plurality of blocks comprises a checksum for the corresponding block.

11. The storage server of claim 9, wherein each of the first and second datasets comprises a volume, a directory, a file, or a read-only, persistent point-in-time image (RPPI) of a volume, a directory or a file.

12. The storage server of claim 9, wherein fixing the second dataset to make the second dataset consistent with the datastream representing the RPPI of the first dataset further comprises:
    identifying a first portion of the datastream representing the RPPI of the first dataset that is inconsistent with a second portion of the second dataset;
    receiving the first portion from the second storage system; and
    fixing the second dataset according to the first portion.

13. The storage server of claim 12, wherein the first portion comprises at least one of the first plurality of blocks and the second portion comprises at least one of the second plurality of blocks.

14. The storage server of claim 13, wherein fixing the second dataset according to the first portion comprises:
    deleting said at least one of the second plurality of blocks; and
    adding at least one new block to the second dataset, the new block or blocks being consistent with said at least one of the first plurality of blocks.

15. A non-transitory machine-readable mediun having sequences of instructions stored therein which, when executed by a processor of a processing system, cause the processor to perform a process for fixing data inconsistency between a first dataset stored as a first plurality of blocks on a source storage system and second dataset stored as a second plurality of blocks on a destination storage system comprising:
    determining, by the destination storage system, a read-only persistent point-in-time image (RPPI) of the first dataset from which the second dataset was created, wherein the RPPI of the first dataset is stored as a first plurality of blocks and the second dataset is stored as a second plurality of blocks, and wherein the RPPI of the first dataset is stored on the source storage system;
    receiving, by the destination storage system, a message from the source storage system confirming a relationship between the RPPI of the first dataset and the second dataset;
    receiving, by the destination storage system, a datastream representing the RPPI of the first dataset from the source storage system, wherein the datastream comprises a first set of metadata associated with the RPPI of the first dataset;
    comparing, by the destination storage system, the first set of metadata associated with the RPPI of the first dataset with a second set of metadata associated with the second dataset to determine whether the datastream representing the RPPI of the first dataset is consistent with the second dataset, wherein the first set of metadata includes metadata of each of the first plurality of blocks, and wherein the second set of metadata includes metadata of each of the second plurality of blocks; and
    if the datastream representing the RPPI of the first dataset is inconsistent with the second dataset, then
        identifying a first block from the first plurality of blocks that is inconsistent with a corresponding block, from the second plurality of blocks, deleting the corresponding block, from the second dataset, and adding a new block to the second dataset, the new block being consistent with the first block.

16. A non-transitory machine-readable mediun of claim 15, wherein metadata of each of the first and second plurality of blocks comprises a checksum for the corresponding block.

17. A non-transitory machine-readable mediun of claim 15, wherein each of the first and second datasets comprises a volume, a directory, a file, or a read-only, persistent point-in-time image (RPPI) of a volume, a directory or a file.

18. A method for fixing data inconsistency between a plurality of first datasets located on a source storage system and a plurality of second datasets located on a destination storage system, the method comprising the steps of:

determining, by the destination storage system, a pair of datasets between the plurality of first datasets and the plurality of second datasets, wherein the pair of datasets includes a RPPI of a first dataset located on the source storage system and a second dataset created as a mirror of the RPPI of the first dataset located on the destination storage system, and wherein the RPPI of the first dataset is stored as a first plurality of blocks and the second dataset is stored as a second plurality of blocks;

receiving, by the destination storage system, a message from the source storage system confirming a relationship between the first dataset and the second dataset;

receiving, by the destination storage system, a datastream representing the RPPI of the first dataset from the source storage system, wherein the datastream comprises a first set of metadata associated with the RPPI of the first dataset;

determining, by the destination storage system, whether the second dataset is consistent with the datastream representing the RPPI of the first dataset by comparing the first set of metadata associated with the RPPI of the first dataset and a second set of metadata associated with the second dataset, wherein the first set of metadata includes metadata of each of the first plurality of blocks, and wherein the second set of metadata is stored on the destination storage system and includes metadata of each of the second plurality of blocks; and if the second dataset is inconsistent with the datastream representing the RPPI of the first dataset, fixing, by the destination storage system, the second dataset to make the second dataset consistent with the datastream representing the RPPI of the first dataset, wherein only a portion of the second dataset which is inconsistent is fixed.

19. The method of claim 18, wherein metadata of each of the first and second plurality of blocks comprises a checksum for the corresponding block.

20. The method of claim 18, wherein each of the plurality of first and second datasets comprises a volume, a directory, a file, or a read-only, persistent point-in-time image (RPPI) of a volume, a directory or a file.

21. The method of claim 18, wherein fixing the second dataset to make the second dataset consistent with the datastream representing the RPPI of the first dataset further comprises:

identifying a first portion of the datastream representing the RPPI of the first dataset that is inconsistent with a second portion of the second dataset; and fixing the second dataset according to the first portion.

22. The method of claim 21, wherein the first portion of the datastream representing the RPPI of the first dataset comprises at least one of the first plurality of blocks and the second portion of the second dataset comprises at least one of the second plurality of blocks.

23. The method of claim 22, wherein fixing the second dataset according to the first portion comprises:

deleting said at least one of the second plurality of blocks; and adding at least one new block to the second dataset, said new block or blocks being consistent with said at least one of the first plurality of blocks.

24. A method for fixing data inconsistency between an original dataset stored as a first plurality of blocks on a source storage system and a mirror of the original dataset stored as a second plurality of blocks on a destination storage system, the method comprising:

determining, by a destination storage system, a read-only persistent point-in-time image (RPPI) of the original dataset from which the mirror of the original dataset was created, wherein the RPPI of the original dataset is stored on the source storage system;

receiving, by the destination storage system, a message from the source storage server confirming a relationship between the RPPI of the original dataset and the minor of the original dataset;

receiving, by the destination storage system, a datastream representing the RPPI of the original dataset from the source storage system, wherein the datastream comprises a first set of metadata associated with the RPPI of the original dataset;

determining, by the destination storage system, whether the minor is consistent with the datastream representing the RPPI of the original dataset by comparing the first set of metadata associated with the RPPI of the original dataset and a second set of metadata associated with the minor, wherein the second set of metadata is stored on the destination storage system; and fixing, by the destination storage system, the mirror to make the mirror consistent with the datastream representing the RPPI of the original dataset by re-writing one or more of the second plurality of blocks on the destination storage system, responsive to one or more of the second plurality of blocks being inconsistent with the datastream representing the RPPI of the original dataset, wherein only the one or more of the second plurality of blocks which are inconsistent are re-written.

25. The method of claim 24, wherein the first set of metadata includes metadata of each of the first plurality of blocks and the second set of metadata includes metadata of each of the second plurality of blocks.

26. The method of claim 25, wherein metadata of each of the first and second plurality of blocks comprises a checksum for the corresponding block.

27. The method of claim 24, wherein the original dataset comprise a volume, a directory, a file, or a read-only, persistent point-in-time image (RPPI) of a volume, a directory or a file.

* * * * *